(12) United States Patent
Eluard et al.

(10) Patent No.: US 8,477,018 B2
(45) Date of Patent: Jul. 2, 2013

(54) ROTATION-ACTIVATED ELECTRONIC COMPONENT WITH TIME-LIMITED USE

(75) Inventors: Marc Eluard, Acigne (FR); Yves Maetz, Melesse (FR); Niclas Stahl, Sartrouville (FR)

(73) Assignee: Thomson Licensing, Issy-les-Moulineaux (FR)

( * ) Notice: Subject to any disclaimer, the term of this patent is extended or adjusted under 35 U.S.C. 154(b) by 180 days.

(21) Appl. No.: 12/930,742

(22) Filed: Jan. 15, 2011

(65) Prior Publication Data
US 2011/0199189 A1    Aug. 18, 2011

(30) Foreign Application Priority Data
Feb. 15, 2010    (EP) .................................... 10305147

(51) Int. Cl.
*H04Q 5/22* (2006.01)
*G08B 13/14* (2006.01)
*G08B 17/06* (2006.01)
*G11B 7/00* (2006.01)
*G11B 19/00* (2006.01)
*G06K 7/10* (2006.01)
*G06K 19/00* (2006.01)
*G06K 19/06* (2006.01)
*H04B 17/00* (2006.01)
*H04B 1/38* (2006.01)

(52) U.S. Cl.
USPC ............... 340/10.5; 340/572.3; 340/572.8; 340/593; 369/100; 369/29.02; 235/472.01; 235/487; 235/492; 455/67.11; 455/557

(58) Field of Classification Search
USPC .............. 340/10.1, 572.7, 572.8, 10.5, 572.1, 340/3.1; 235/375, 437, 492, 380, 454, 487, 235/488, 441, 440; 369/100, 103, 106; 455/412.1
See application file for complete search history.

(56) References Cited

U.S. PATENT DOCUMENTS

| | | | |
|---|---|---|---|
| 6,678,824 B1 * | 1/2004 | Cannon et al. | 726/22 |
| 2003/0034400 A1 * | 2/2003 | Han et al. | 235/487 |
| 2006/0250923 A1 * | 11/2006 | Ferren et al. | 369/100 |
| 2006/0291354 A1 * | 12/2006 | Ferren et al. | 369/52.1 |
| 2007/0072553 A1 * | 3/2007 | Barbera | 455/67.11 |
| 2007/0210920 A1 * | 9/2007 | Panotopoulos | 340/572.1 |
| 2008/0136648 A1 * | 6/2008 | Endrikhovski et al. | 340/572.8 |
| 2008/0157974 A1 * | 7/2008 | Boss et al. | 340/572.3 |
| 2008/0159108 A1 * | 7/2008 | Ferren et al. | 369/100 |
| 2008/0159109 A1 * | 7/2008 | Ferren et al. | 369/100 |

* cited by examiner

*Primary Examiner* — Jennifer Mehmood
*Assistant Examiner* — Mirza Alam
(74) *Attorney, Agent, or Firm* — Myers Wolin, LLC

(57) ABSTRACT

A rotation-activated electronic component, preferably a RFID tag mounted on or incorporated in a support that is rotated when read, e.g. a CD or DVD. The RFID tag comprises an antenna, a rotational switch, a component, advantageously a processor, and a time usage limiter. The antenna is adapted to transform received RFID signals to electric energy that powers the component and the rotational switch is adapted to cut the circuit unless the support does not rotate at or above a certain rotational speed. The time usage limiter counts down a timer when it is powered via the rotational switch and disables the RFID tag when the timer expires. Supports equipped with the RFID tag of the invention will thus respond until the timer expires, and preferably only if they rotate sufficiently.

10 Claims, 3 Drawing Sheets

ROTATION-ACTIVATED ELECTRONIC COMPONENT WITH TIME-LIMITED USE

This application claims the benefit, under 35 U.S.C. §119 of European Patent Application 10305147.0, filed 15 Feb. 2010.

TECHNICAL FIELD

The present invention relates generally to electronic components, and more particularly to a rotation-activated electronic component for which the use is limited in time.

BACKGROUND

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

Radio-frequency identification (RFID) uses an object, an RFID tag (hereinafter "tag"), which interacts with transmitted radio waves, for example in systems for theft prevention, supply chain management or access to buildings. A typical tag comprises at least two parts: an antenna that receives and transmits a radio-frequency (RF) signal, and an integrated circuit that stores and processes information and processes the signal. Some tags, called "active", comprise a battery and are thus autonomous, while "passive" tags have no battery and therefore have to rely on external power, often the received RF signal, in order to function properly.

It has been proposed, for example in WO 2006032613, to use tags on or in digital supports such as CDs and DVDs. This may for example be done in order to protect the content on the digital support (information necessary to access the content is comprised in the tag) or to store preferences regarding the playback of the content.

US 2008/0157974 A1 presents a solution in which a RFID tag may be disabled (and later re-enabled) based on time. The solution, which for example may be used at a video rental outlet, has an event, such as purchase of a DVD, activate a countdown timer. The RFID tag is then enabled until the countdown timer expires, after which the RFID tag is disabled. While this solution may achieve its goal, it is also somewhat limited as to the possibilities, as the countdown starts directly upon occurrence of the event and then inexorably counts down.

US 2006/250923 describes rotationally activated mechanisms to produce a modification to a data storage medium to render data thereon unreadable or inaccessible. These mechanisms, which include fluid-mediated mechanisms and mechanical switches, modify the medium physically, e.g. by altering the read surface of an optical medium, but they cannot be used to limit the time in any way as for instance US 2008/0157974 A1 can.

It can therefore be appreciated that there is a need for a solution that provides an alternative to the prior art. The present invention provides such a solution.

SUMMARY OF INVENTION

In a first aspect, the invention is directed to an electronic module comprising communication means adapted to interact with an external device, a power source, a component adapted to process first information received from the communication means and to send second information to the communication means, the second information being intended for the external device. The electronic module further comprises a time usage limiter for disabling the electronic module after a predetermined time in use and a switch adapted to provide power to the time usage limiter when it is subject to predetermined rotational speed so that the time usage limiter can keep track of the time in use.

In a first preferred embodiment, the switch provides power when the rotational speed is above a threshold value. It is advantageous that the power provided by the switch is also provided to the component.

In a second preferred embodiment, the communication means is an antenna. It is advantageous that the electronic component is a Radio Frequency Identification (RFID) tag. It is also advantageous that the antenna is further adapted to function as the power source by transforming Radio Frequency (RF) signals to electric energy.

In a third preferred embodiment, the power source is a battery.

In a fourth preferred embodiment, the time usage limiter disables the electronic device by physically destroying a part of the electronic module.

In a second aspect, the invention is directed to an information medium adapted to store content and comprising an electronic module according to the first aspect.

In a first preferred embodiment, access to content stored on the information medium is enhanced or enabled by information accessible from the electronic module.

BRIEF DESCRIPTION OF DRAWINGS

Preferred features of the present invention will now be described, by way of non-limiting example, with reference to the accompanying drawings, in which FIG. 1 schematically illustrates a rotation-activated RFID tag.

DESCRIPTION OF EMBODIMENTS

Figure 1:
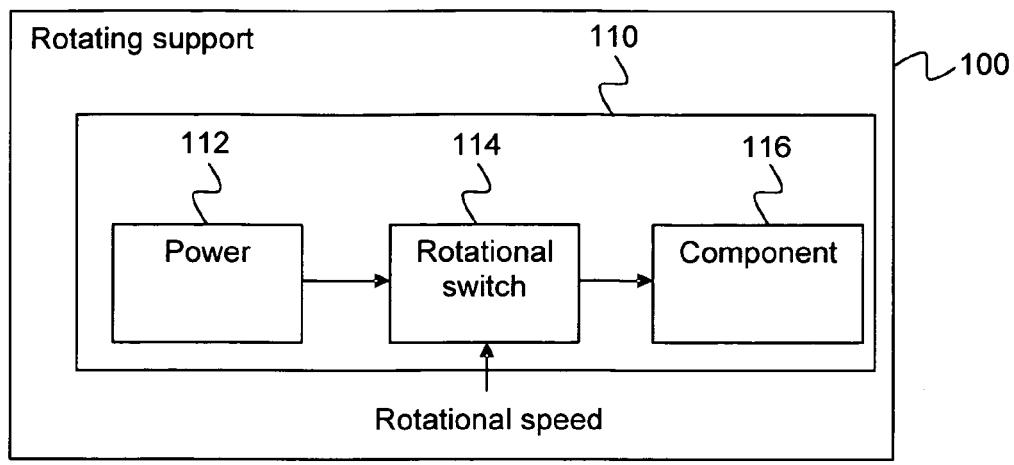

European Patent Application 09305533.3 discloses a RFID tag intended for use on a rotatable support, advantageously a DVD, CD-ROM, BluRay disc, or the like. The RFID tag comprises a switch that, in one embodiment, can make sure that the RFID tag does not communicate unless the support rotates at a minimum speed at least. An exemplary use of the prior art RFID tag is to ensure that only a RFID tag of a support that is used responds to requests from the RFID reader; not RFID tags on or in supports that just lie in the vicinity. FIG. 1 illustrates an exemplary embodiment of this RFID tag. The tag 110 is fixed to a rotating support 100, i.e. a support that may rotate. The tag 110 comprises a power source 112, a rotational switch 114 and a component 116 that preferably has processor and memory capabilities. Located between the power source 112 and the component 116 is a rotational switch 114 that is arranged to cut the electric contact between the power source 112 and the component 116 unless it is subject to sufficient rotational speed. The component 116 is thus not powered if the rotating support does not rotate quickly enough. When the component 116 is powered, it functions as a powered component of a prior art tag would do, notably communicating with a RFID reader.

A main idea of the present invention is to add a temporal limitation to the usage of the electronic module, by disabling the rotation switch functionality when the time limit is reached. However, the present invention differs from US 2008/0157974 A1 in that where the prior art uses an 'absolute' time, the present invention is adapted to limit the active use of the RFID tag. To illustrate the difference, the prior art solution may limit use to 24 consecutive hours counted from the time of rental, while the present invention for example can limit use to 4 hours spread out over an practically unlimited time.

Figure 2:
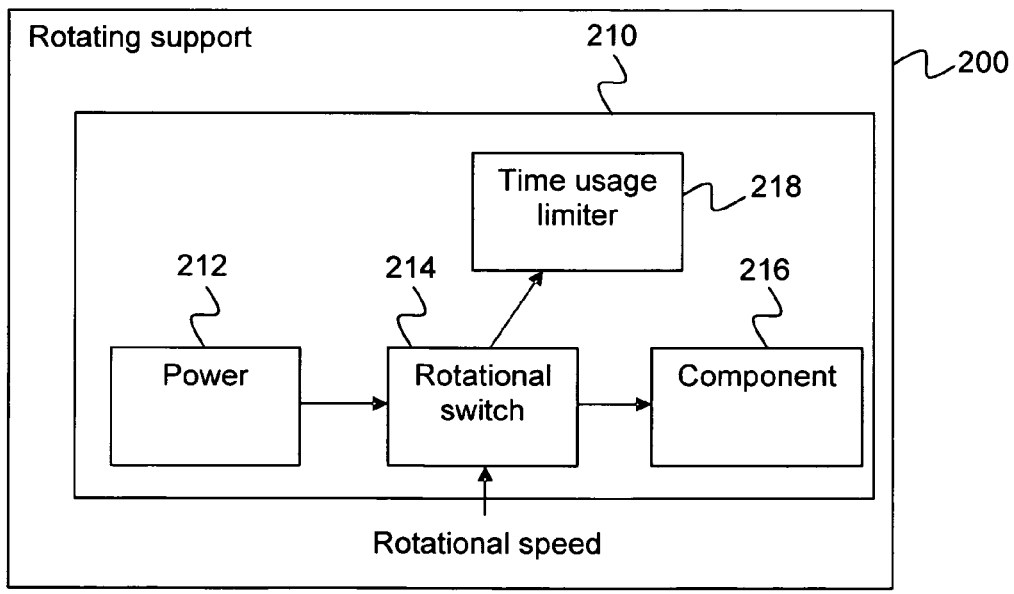
FIG. 2 schematically illustrates a time limited rotation-activated RFID tag according to a preferred embodiment of the present invention.

FIG. 2 schematically illustrates a time limited rotation-activated RFID tag according to a preferred embodiment of the present invention. The RFID tag 210 is fixed to or incorporated in a rotatable support 200. The RFID tag 210 comprises a power source 212, for example a battery or an antenna that converts radio waves to electrical energy. The RFID tag 210 further comprises a rotational switch 214, a component 216, for example a processor, and a time usage limiter 218. The rotational switch 214 is adapted to provide electrical power to the component 216 and the time usage limiter 218 when sufficient rotational speed is applied to it.

The time usage limiter 218 comprises a countdown timer that decrements from a predefined value. When the countdown timer reaches zero, the time usage limiter 218 disables the RFID tag 210. However, as the time usage limiter 218 is powered only at sufficient rotational speed, the countdown timer decrements only when this is the case. It will be appreciated that it is very unlikely for this to happen when the support is not rotating and the use will thus be at the very least close to the intended value.

The time usage limiter 218 preferably disables the RFID tag 210 through a physical action that permanently disables the power supply for the electronic module, but it is also possible to disable the RFID tag 210 logically. In the former case, the action may be the permanent burning of a fuse; in the latter case, the action may be sending a command to the component to enter a non-working state from which no return is possible. In any case, the RFID does not respond when the countdown timer has expired.

In a preferred embodiment, the time usage limiter is embedded in either the rotational switch or the component; preferably, the three are embedded in one physical component. The embedding makes it more difficult to bypass the disabling.

Figure 3:
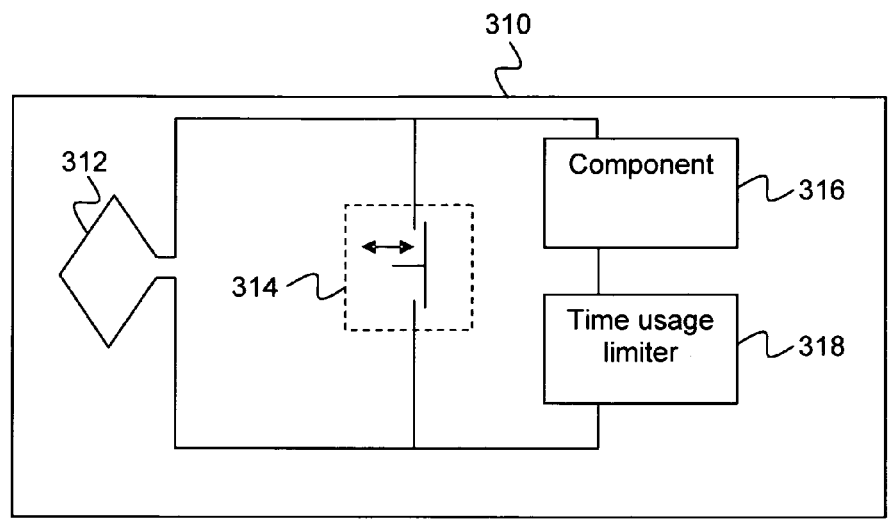
FIG. 3 illustrates an implementation of a RFID tag according to a preferred embodiment of the present invention.

FIG. 3 illustrates an implementation of a RFID tag 310 according to a preferred embodiment of the present invention. The RFID tag 310 comprises a component 316, a power source embodied by an antenna 312, and a rotational switch 314. The antenna 312 is adapted for RF communication, i.e. transmission and reception of RF signals, and as a power supply by transforming RF signal energy to electrical energy. The rotational switch 314 comprises a first part that is movable so as to break the shortcut connection when subject to sufficient rotational energy and to establish the connection when it is not, i.e. electrical energy is provided when the rotational energy is sufficient. The skilled person will appreciate that the use of a shortcut connection is preferably only used when the power source is an antenna, but not when it is a battery.

The RFID tag 310 further comprises a time usage limiter 318 adapted to count down from a predetermined value. When it reaches zero, it takes action to disable the RFID tag 310. A couple of disabling solutions have already been described hereinbefore; the exemplary time usage limiter 318 of FIG. 3 preferably disables the RFID tag 310 by breaking the circuit so that the output of the component 316 never reaches the antenna 312. Naturally, the time usage limiter 318 may equally well be put before the component 316 so that any input fails to reach the latter when the RFID tag 310 is disabled.

The skilled person will appreciate that it is also possible to arrange the antenna 312, the rotational switch 314 and the component 316 in series (something that holds true for any suitable embodiment).

Figures 4A, 4B:
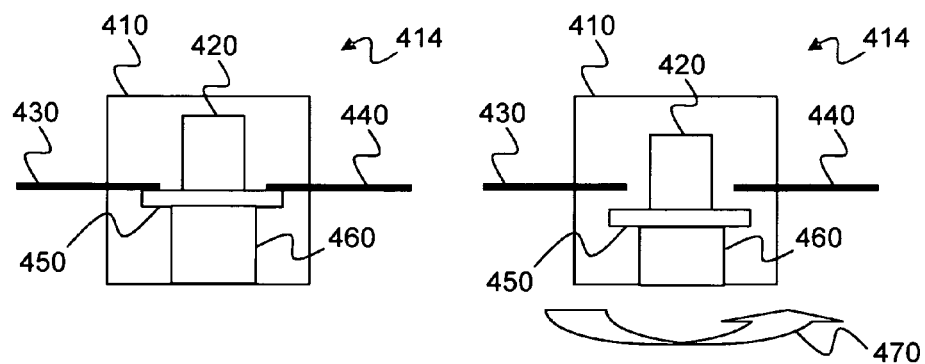
FIGS. 4a and 4b illustrate an exemplary embodiment of a rotational switch.

FIGS. 4a and 4b illustrate an exemplary embodiment of a rotational switch. The exemplary preferred embodiment does not power a tag in the absence of rotational energy.

The rotational switch 414 comprises a housing 410. A first and a second electrode 430, 440 enter the housing 410 but are arranged at a distance from one another. The space between the first and the second electrode 430, 440 can be bridged by a movable conducting connector 450, which is arranged on a spring 460. A weight 420 is arranged on the connector 450, but this weight 420 may naturally be an integral part of the connector 450.

FIG. 4a shows the situation where no or insufficient rotational speed is imparted on the rotational switch 414. In this case, the connector 450 connects the first and second electrodes 430, 440 thereby causing a short circuit, which in turn means that a component arranged in parallel is not powered. In other words, when the rotational switch 414 does not rotate sufficiently, the component is inoperative.

FIG. 4b shows the situation where sufficient rotational speed 470 is applied to the rotational switch 414. The rotational force imparted by the rotation on the weight 420 and the connector 450 is now greater than the opposite force provided by the spring 460. This breaks the contact between the first and second electrodes 430, 440, which means that the short circuit is no longer working. The energy provided by a power source then reaches the component, thereby powering the same.

Figure 5A:
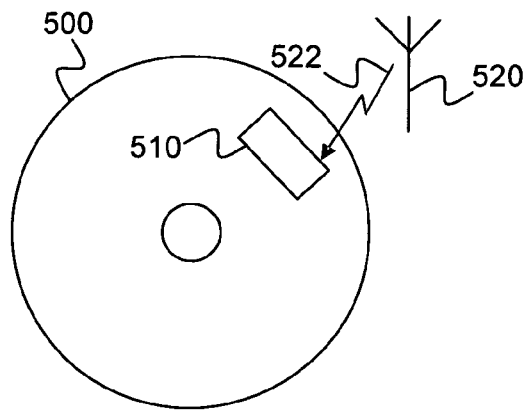
FIGS. 5a, 5b and 5c illustrate a medium equipped with a RFID tag according to a preferred embodiment of the present invention
Figure 5B:
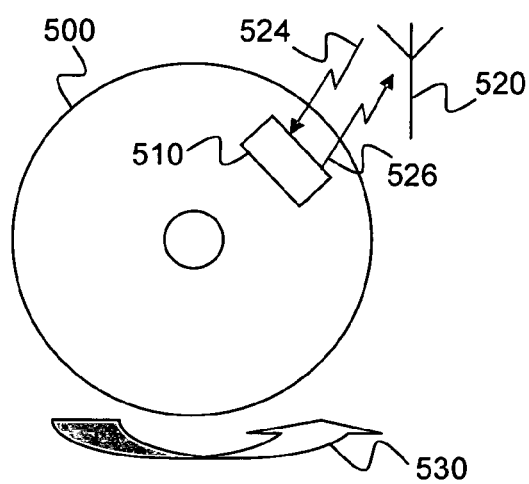
Figure 5C:
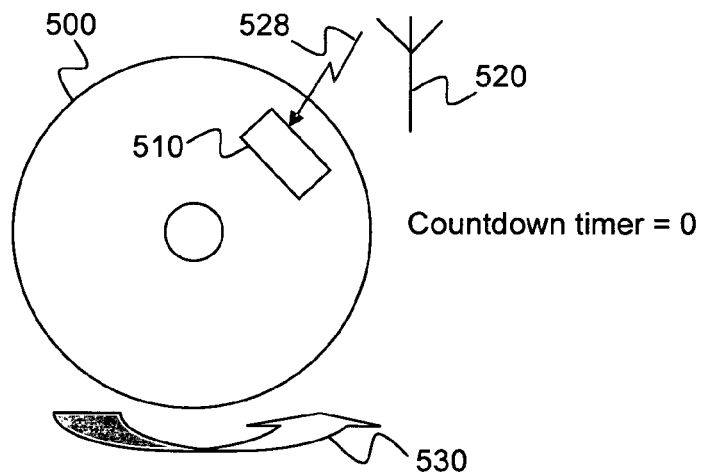

FIGS. 5a, 5b and 5c illustrate a medium 500, e.g. a DVD, equipped with a RFID tag 510 according to a preferred embodiment of the present invention. The medium 500 is within communication range of an antenna 520 of an external device, such as a reader for the medium 500, e.g. a DVD player.

In FIG. 5a, it is illustrated how the antenna 520 sends RF energy 522 towards the antenna (not shown) of the RFID tag 510. However, as the medium does not rotate sufficiently to power the component (not shown) of the RFID tag 510, the RFID tag 510 does not respond.

FIG. 5b, on the other hand, illustrates the case when the medium 500 and its RFID tag 510 are subject to sufficient rotational energy 530 for the rotational switch (not shown) to engage so as to power the component. In this case, when the antenna 520 sends a RF signal 524 to the RFID tag 510, the latter is able to process the information in the signal 524 and send a response 526. In addition, as power is provided also to the time usage limiter, the timer is counted down.

Finally, FIG. 5c illustrates the case when the countdown timer has reached zero and the RFID tag is disabled. Even though sufficient rotational energy 530 is applied to the rotational switch, no response is provided to the signal 524, as the time usage limiter (not shown) has disabled the RFID tag 510.

The skilled person will appreciate that the information provided by the tag 510 can enable use—possibly enhanced or improved—of the content on the medium 500. To obtain this information, the reader sends a RF signal to the tag that returns the required information. For example, the information may be a decryption key, the result of a computation performed by the tag's component (i.e. its processor), information related to the rendering of the content on the medium (such as volume, language, subtitles), or, in the case of a computer game, information about the current state of the game (such as character equipment and characteristics, available cars and race tracks, player high scores, . . . ).

It will be appreciated that the present invention can ensure a time limit for the use of a RFID tag on or in a rotating support.

It will be appreciated that a tag is a convenient and economic way of manufacturing the module, as it may then be affixed to any suitable support. It is however also possible to include the tag as a part of a bigger structure intended to be rotated during use, e.g. by including it in the support.

Each feature disclosed in the description and (where appropriate) the claims and drawings may be provided independently or in any appropriate combination. Reference numerals appearing in the claims are by way of illustration only and shall have no limiting effect on the scope of the claims.

The invention claimed is:

1. An electronic module comprising:
   a communication module adapted to interact with an external device,
   a power source,
   a component adapted to process first information received from the communication module and to send second information to the communication module, wherein the second information being intended for the external device,
   a time usage limiter for disabling the electronic module after a predetermined time in use, and
   a switch adapted to provide power to the time usage limiter when it is subject to predetermined rotational speed so that the time usage limiter can keep track of the time in use.

2. The electronic module of claim 1, wherein the switch provides power when the rotational speed is above a threshold value.

3. The electronic module of claim 2, wherein the power provided by the switch also is provided to the component.

4. The electronic module of claim 1, wherein the communication module is an antenna.

5. The electronic module of claim 4, wherein the electronic component is a Radio Frequency Identification tag.

6. The electronic module of claim 4, wherein the antenna is further adapted to function as the power source by transforming Radio Frequency signals to electric energy.

7. The electronic module of claim 1, wherein the power source is a battery.

8. The electronic module of claim 1, wherein the time usage limiter disables the electronic module by physically destroying a part of the electronic module.

9. An information medium adapted to store content and comprising an electronic module according to claim 8.

10. The information medium of claim 9, wherein access to content stored on the information medium is enhanced or enabled by information accessible from the electronic module.

* * * * *